US011442791B2

(12) United States Patent
Xu et al.

(10) Patent No.: US 11,442,791 B2
(45) Date of Patent: Sep. 13, 2022

(54) MULTIPLE SERVER-ARCHITECTURE CLUSTER FOR PROVIDING A VIRTUAL NETWORK FUNCTION

(71) Applicant: HUAWEI TECHNOLOGIES CO., LTD., Shenzhen (CN)

(72) Inventors: Enqi Xu, Shenzhen (CN); Jingjing Zhang, Shenzhen (CN); Zhisai Chen, Shenzhen (CN); Wanhong Meng, Shenzhen (CN); Tiancheng Jing, Shenzhen (CN)

( * ) Notice: Subject to any disclaimer, the term of this patent is extended or adjusted under 35 U.S.C. 154(b) by 0 days.

(21) Appl. No.: 17/002,503

(22) Filed: Aug. 25, 2020

(65) Prior Publication Data
US 2020/0387406 A1    Dec. 10, 2020

Related U.S. Application Data

(63) Continuation of application No. PCT/CN2018/089622, filed on Jun. 1, 2018.

(51) Int. Cl.
*G06F 15/16*       (2006.01)
*G06F 9/50*        (2006.01)
(Continued)

(52) U.S. Cl.
CPC ........ *G06F 9/5077* (2013.01); *G06F 9/45558* (2013.01); *H04L 41/5048* (2013.01); *H04L 47/2441* (2013.01); *G06F 2009/45595* (2013.01)

(58) Field of Classification Search
CPC .............. G06F 9/5077; G06F 9/45558; G06F 2009/45595
See application file for complete search history.

(56) References Cited

U.S. PATENT DOCUMENTS

| 9,979,602 | B1 * | 5/2018 | Chinnakannan | ...... H04L 47/765 |
| 10,355,989 | B1 * | 7/2019 | Panchai | .................. H04L 67/10 |

(Continued)

FOREIGN PATENT DOCUMENTS

| CN | 104142853 A | 11/2014 |
| CN | 105429780 A | 3/2016 |

(Continued)

OTHER PUBLICATIONS

Skoldstrom, P., et al., "Towards Unified Programmability of Cloud and Carrier Infrastructure," 2014 Third European Workshop On Software Defined Networks, IEEE, Sep. 1, 2014, pp. 55-60, XP032703409.

(Continued)

*Primary Examiner* — Hieu T Hoang
(74) *Attorney, Agent, or Firm* — Conley Rose, P.C.

(57) ABSTRACT

Provided is a method and a network apparatus in a cloud infrastructure. The network apparatus includes a processor, and a memory coupled to the processor, the memory for storing computer instructions that, when executed by the processor, cause the processor to generate a resource abstraction layer relating a network cluster including a first server architecture with a first resource set and a second server architecture with a second resource set, to generate an orchestration layer configured to receive a packet flow request and, in response to the packet flow request, schedule virtual network resources based on the resource abstraction layer for servicing a packet flow, and to deploy the virtual network resources to receive and service the packet flow.

20 Claims, 5 Drawing Sheets

(51) Int. Cl.
*G06F 9/455* (2018.01)
*H04L 41/5041* (2022.01)
*H04L 47/2441* (2022.01)

(56) References Cited

U.S. PATENT DOCUMENTS

| | | | | |
|---|---|---|---|---|
| 10,382,346 | B2* | 8/2019 | Murugesan | G06F 13/128 |
| 10,999,219 | B1* | 5/2021 | Athreyapurapu | H04L 41/5051 |
| 2009/0075626 | A1* | 3/2009 | Shan | H04M 15/00 |
| | | | | 455/406 |
| 2010/0080226 | A1* | 4/2010 | Khalid | H04L 41/5003 |
| | | | | 370/392 |
| 2011/0134915 | A1* | 6/2011 | Srinivasan | G06F 13/28 |
| | | | | 370/389 |
| 2011/0196940 | A1 | 8/2011 | Martinez et al. | |
| 2013/0219391 | A1 | 8/2013 | Lee et al. | |
| 2014/0201374 | A1 | 7/2014 | Ashwood-Smith et al. | |
| 2014/0310388 | A1 | 10/2014 | Djukic et al. | |
| 2015/0063166 | A1* | 3/2015 | Sif | G06F 9/541 |
| | | | | 455/418 |
| 2015/0082308 | A1* | 3/2015 | Kiess | G06F 9/45558 |
| | | | | 718/1 |
| 2016/0057209 | A1 | 2/2016 | Parikh et al. | |
| 2016/0094573 | A1* | 3/2016 | Sood | H04L 63/0428 |
| | | | | 713/156 |
| 2016/0182567 | A1* | 6/2016 | Sood | H04L 63/10 |
| | | | | 726/1 |
| 2016/0212016 | A1* | 7/2016 | Vrzic | H04L 41/5051 |
| 2016/0212017 | A1* | 7/2016 | Li | H04L 41/12 |
| 2016/0234082 | A1* | 8/2016 | Xia | H04L 41/5096 |
| 2017/0063598 | A1* | 3/2017 | Zhu | H04L 41/5041 |
| 2017/0075732 | A1* | 3/2017 | Itoh | H04L 67/1004 |
| 2017/0078143 | A1* | 3/2017 | Zhao | H04L 41/5054 |
| 2017/0078216 | A1* | 3/2017 | Adolph | H04L 67/16 |
| 2017/0086049 | A1* | 3/2017 | Vrzic | H04W 40/00 |
| 2017/0116021 | A1* | 4/2017 | Miller | G06F 9/45558 |
| 2017/0134483 | A1* | 5/2017 | Miller | H04L 67/1031 |
| 2017/0141973 | A1* | 5/2017 | Vrzic | H04L 41/5051 |
| 2017/0195173 | A1 | 7/2017 | Izenberg et al. | |
| 2017/0223035 | A1* | 8/2017 | Watanabe | H04L 41/0896 |
| 2017/0237647 | A1* | 8/2017 | N. | G06F 9/45558 |
| | | | | 709/224 |
| 2017/0279672 | A1* | 9/2017 | Krishnan | G06F 9/45558 |
| 2017/0288971 | A1* | 10/2017 | Jayaraman | H04L 41/5051 |
| 2017/0371692 | A1* | 12/2017 | Connolly | G06F 9/45558 |
| 2018/0024866 | A1* | 1/2018 | Yoshimura | H04L 41/50 |
| | | | | 709/226 |
| 2018/0121227 | A1* | 5/2018 | Peng | G06F 9/45558 |
| 2018/0173547 | A1* | 6/2018 | Stokes | G06F 8/60 |
| 2018/0255463 | A1* | 9/2018 | Zheng | G06F 9/5005 |
| 2018/0338346 | A1* | 11/2018 | Routt | H04L 43/045 |
| 2019/0007320 | A1* | 1/2019 | Sukhomlinov | H04L 47/125 |
| 2019/0042292 | A1* | 2/2019 | Palermo | G06F 12/0811 |
| 2019/0109756 | A1* | 4/2019 | Abu Lebdeh | G06F 9/5077 |
| 2020/0401432 | A1* | 12/2020 | Nakano | G06F 9/5044 |

FOREIGN PATENT DOCUMENTS

| | | |
|---|---|---|
| CN | 108063735 A | 5/2018 |
| WO | 2016118636 A1 | 7/2016 |

OTHER PUBLICATIONS

"Network Functions Virtualisation (NFV); Ecosystem; Report on SDN Usage in NFV Architectural Framework," Draft ETSI GS NFV-EVE 005, ETSI Draft; Draft ETSI GS NFV-EVE 005, vol. ISG NFV, No. V0.1.2, Sep. 16, 2015, 132 pages, XP014251095.

"Network Functions Virtualisation (NFV); Management and Orchestration," Group Specification, European Telecommunications Standards Institute (ETSI), ETSI GS NFV-MAN 001, V1.1.1, Dec. 1, 2014, XP014235740, 184 pages.

Raho, M., et al., "KVM, Xen and Docker: a performance analysis for ARM based NFV and Cloud computing," 2015 IEEE 3rd Workshop on Advances in Information, Electronic and Electrical Engineering (AIEEE), 2015, 8 pages.

* cited by examiner

MULTIPLE SERVER-ARCHITECTURE CLUSTER FOR PROVIDING A VIRTUAL NETWORK FUNCTION

CROSS-REFERENCE TO RELATED APPLICATIONS

The present application is a continuation of International Application No. PCT/CN2018/089622 filed Jun. 1, 2018, by Huawei Technologies Co., Ltd., and titled "Multiple Server-Architecture Cluster For Providing A Virtual Network Function," the teachings and disclosures of which are hereby incorporated in their entireties by reference thereto.

BACKGROUND

Virtualization is the ability to simulate a hardware platform, such as a server, storage device, or network resource, in software. Hardware that supports virtualization may be commercial off-the-shelf platforms. These hardware platforms may be used to provide a virtualized solution that may be more portable, scalable, and cost-effective than a traditional hardware-based solution.

SUMMARY

In an embodiment, the disclosure includes a network apparatus in a cloud infrastructure. The network apparatus includes a processor, and a memory coupled to the processor, the memory for storing computer instructions that, when executed by the processor, cause the processor to generate a resource abstraction layer relating a network cluster including a first server architecture with a first resource set and a second server architecture with a second resource set, the resource abstraction layer including a management and network orchestration parameter, generate an orchestration layer configured to receive a packet flow request and, in response to the packet flow request, schedule virtual network resources based on the resource abstraction layer for servicing a packet flow, and deploy the virtual network resources to receive and service the packet flow. Optionally, in any of the preceding aspects, another implementation of the aspect provides that the orchestration layer is further configured to schedule resources for a tunnel connection between the first server architecture and the second server architecture for jointly servicing the packet flow. Optionally, in any of the preceding aspects, another implementation of the aspect provides that the first server architecture is different from the second server architecture. Optionally, in any of the preceding aspects, another implementation of the aspect, the first server architecture is configured to service at least one of a service function chaining (SFC) network function, a point-to-point protocol over Ethernet (PPPOE) network function, a link network address translation (NAT) network function; or a router network function. Optionally, in any of the preceding aspects, another implementation of the aspect provides that the second server architecture is configured to service at least one of a security network function; a uniform resource locator (URL) network function; or a parental control network function. Optionally, in any of the preceding aspects, another implementation of the aspect provides that the packet flow request comprises a traffic flow classification for the packet flow. Optionally, in any of the preceding aspects, another implementation of the aspect provides that the network cluster is one of a plurality of network clusters in a stem-leaf configuration to form the cloud infrastructure.

In an embodiment, the disclosure includes a method. The method includes generating a resource abstraction layer relating a network cluster including a first server architecture with a first resource set and a second server architecture with a second resource set, generating an orchestration layer configured to receive a packet flow request and, in response to the packet flow request, scheduling virtual network resources based on the resource abstraction layer for servicing a packet flow, and deploying the virtual network resources to receive and service the packet flow. Optionally, in any of the preceding aspects, another implementation of the aspect provides that the orchestration layer is further configured to schedule resources for a tunnel connection between the first server architecture and the second server architecture for jointly servicing the packet flow. Optionally, in any of the preceding aspects, another implementation of the aspect provides that the first server architecture is different from the second server architecture. Optionally, in any of the preceding aspects, another implementation of the aspect provides that the first server architecture is configured to service at least one of a service function chaining (SFC) network function, a point-to-point protocol over Ethernet (PPPOE) network function, a link network address translation (NAT) network function; or a router network function. Optionally, in any of the preceding aspects, another implementation of the aspect provides that the second server architecture is configured to service at least one of a security network function, a uniform resource locator (URL) network function, or a parental control network function. Optionally, in any of the preceding aspects, another implementation of the aspect provides that the packet flow request comprises a traffic flow classification for the packet flow. Optionally, in any of the preceding aspects, another implementation of the aspect provides that the network cluster is one of a plurality of network clusters in a stem-leaf configuration to form a cloud infrastructure.

In an embodiment, the disclosure includes a method in a cloud infrastructure. The method includes generating, by a processor, a resource abstraction layer relating a network cluster including a first server architecture with a first resource set and a second server architecture with a second resource set, generating, by the processor, an orchestration layer configured to receive a packet flow request and, in response to the packet flow request, scheduling virtual network resources based on the resource abstraction layer for servicing a packet flow; and deploying, by the processor, the virtual network resources to receive and service the packet flow.

Optionally, in any of the preceding aspects, another implementation of the aspect provides that the orchestration layer is further configured to schedule resources for a tunnel connection between the first server architecture and the second server architecture for jointly servicing the packet flow. Optionally, in any of the preceding aspects, another implementation of the aspect provides that the first server architecture is different from the second server architecture. Optionally, in any of the preceding aspects, another implementation of the aspect provides that the first server architecture is configured to service at least one of a service function chaining (SFC) network function, a point-to-point protocol over Ethernet (PPPOE) network function, a link network address translation (NAT) network function, or a router network function. Optionally, in any of the preceding aspects, another implementation of the aspect provides that the second server architecture is configured to service at least one of a security network function, a uniform resource locator (URL) network function, or a parental control network function. Optionally, in any of the preceding aspects, another implementation of the aspect provides that the packet flow request comprises a traffic flow classification for the packet flow.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

With the exponential increase in bandwidth demand, heavily driven by video, mobile, and Internet-of-Things (IoT) applications, service providers seek out ways to expand and scale their network services. The characteristics of traditional server and network architectures present a bottleneck to this requirement and create many constraints that limit the scalability, deployment costs, and operational efficiency of the network. This situation forces the service providers to consider alternatives that can remove these limitations.

In data centers, the server virtualization approach has been a proven technology, where stacks of independent server hardware systems have mostly been replaced by virtualized servers running on shared hardware. Network functions virtualization (NFV) builds on the concept of server virtualization by expanding the concept beyond servers, and widening the scope to include network devices. The term network functions virtualization generally references the overall environment that includes virtual network devices, management tools, and the infrastructure that integrates these software components with computer hardware. However, network function virtualization allows the replacement of physical network devices that perform specific network functions with one or more software programs executing the same network functions while running on generic computer hardware. One example is replacing a physical firewall device with a software-based virtual machine. The virtual machine provides the firewall functions, runs the same operating system, and has the same look and feel—but on non-dedicated, shared, and generic hardware. Virtualization can mask the physical device, making it possible to use commercial off the shelf (COTS) hardware to provide network functions virtualization.

The virtual implementation of a network function is a virtualized network function (VNF), which is meant to perform certain network functions such as a router, a switch, a firewall, a load-balancer, etc. Combinations of virtualized network functions may be used to implement a complete virtualized networking segment. A NFV framework avoids wasting time and resources that may have otherwise been used to continuously re-provision and decommission network capacity at the physical layer to track network resource growth with demand. As a result, small to medium-sized businesses may opt to lease network services based on the NFV framework.

A NFV framework allows a cloud service provider to offer network services on demand, allowing consumers to add or delete services and devices through self-managed portals. Since cloud services are based on the NFV framework, the new services can be deployed and quicker than conventional network configurations. For example, if a customer seeks to add a firewall to a branch location, the customer can use the self-managed portal to purchase this service. At the back-end, a cloud service provider can generate a new virtual machine and deploy the firewall VNF, and couple the firewall VNF to existing devices of the customer.

A public cloud may provide organizations the ability to take advantage of cloud services when managing their own private cloud is not a cost-effective option. Through these resources, organizations can host their applications, storage, networks, databases and similar items on a cloud infrastructure that is maintained, managed, and operated by the cloud service provider. With the public cloud, the overhead of maintaining the entire hardware infrastructure (comprising computing, networking, and storage etc.) and the tools that are required to manage them, operational costs, etc., is completely offloaded to the provider. In contrast, a private cloud virtualizes an organization's application and networking into one or multiple locations, which are managed, operated, and utilized by the organization itself. As may be appreciated, a hybrid cloud is a combination of aspects of a public cloud and a private cloud.

Network function virtualization supports the cloud categories described above. Cloud service providers may use a private cloud to offer a set of services to their consumers. For example, an Internet service provider may implement a private cloud that has predefined templates for a Customer Gateway (CGW), a firewall, and/or event optional add-ons like content storage, remote management, etc. In operation, a cloud service provider may provision customer requested virtual machines dynamically.

In a public cloud, however, latency and throughput requirements must be considered when cloud hosting based on an NFV framework. Deployment and orchestration of an NFV framework, however, may require multiple connections between other physical components to implement a NFV topology to address latency and throughput. Establishing the VNFs on demand may require orchestrations based on network changes (for example, traffic prioritization changes, data traffic stream blockages, the need to add routing neighbors, etc.) that necessitate awareness of other VNFs. To deploy a NFV framework in the cloud, cloud orchestration and deployment applications take these additional requirements into account.

Generally, virtualization of computer platforms began with x86 platform architectures. The term x86 platform architecture refers to a family of backward-compatible instruction set architectures based on the Intel 8086 processor and the Intel 8088 variant. The term x86 is understood to be used as successors to the 8086 processor end in "86", including the 80186, 80286, 80386, and 80486 processors. Presently, x86 platform architectures continue to be implemented in cloud computing segments.

The open nature of the hardware allows for easy application development for deployment in NVF systems. However, the performance tends to lag, requiring modifications and/or developments with respect to the x86 platform architectures as a means to provide better performance, chaining capabilities, and lower scaling costs.

It is desirable to improve the underlying hardware to provide better performance, such as processing speed, chaining functions, security functions, etc. Such improved hardware may depend on further configurations to increase underlying processing power and acceleration to satisfy VNF performance while also permitting scalable build-out on an economic basis.

For VNF accommodation, access to underlying hardware architectures is made possible through open functions and protocols for programs to interface with the applications, or Application Programmable Interfaces (API) that aid in normalization of the NFV across multiple platforms, including distributed platforms. Accordingly, closed server architectures may not be able to use the NFV because they do not provide the "hooks" or "couplings" to freely allow access to applications.

Adjustments or modifications to x86 architectures tend to over-complicate the physical layer, increasing the complexity and time required to scale, or add to, the underlying physical layer to support a VFN Framework. In an example, smart network interface cards (NICs) were developed with the intent to improve the standard switching protocols working between virtual and physical interfaces. In principle, a smart NIC functions to offload processing from a host processor, such as firewall for security, a layer 2/3 switch for traffic steering, performance acceleration techniques, and network visibility. However, a drawback of a smart NIC is that it increases the configuration parameters of an underlying physical hardware layer. As a result, each server unit addition that includes a smart NIC configuration correspondingly increases the complexity and stability of the underlying physical layer because of the intertwined nature of the specialized components within the underlying architecture further complication is that smart NIC card functionality may be allocated to by the related local server, not by other servers in a network cluster.

Accordingly, disclosed herein is a cloud infrastructure having a first server architecture with a first resource set and a second server architecture with a second resource set. The first server architecture includes a highly-scalable distributed network function (NF) acceleration architecture, directed to network function processing, which supports hierarchical quality of service (HQoS) to control services and users in a cloud infrastructure.

The second server architecture includes or complements the acceleration architectures by providing network functions (NF) not requiring high-throughput characteristics, and that can be offloaded from the first server architecture, such as security, traffic steering, and network visibility. On the other hand, the first server architecture can accept network functions (NF) that require high-throughput characteristics that can be offloaded from the second server architecture. In operation, in which the first server architecture and the second server architecture each provide network functions to service a packet flow, the architectures can be coupled via a tunnel connection to jointly service the packet flow.

Figure 1:
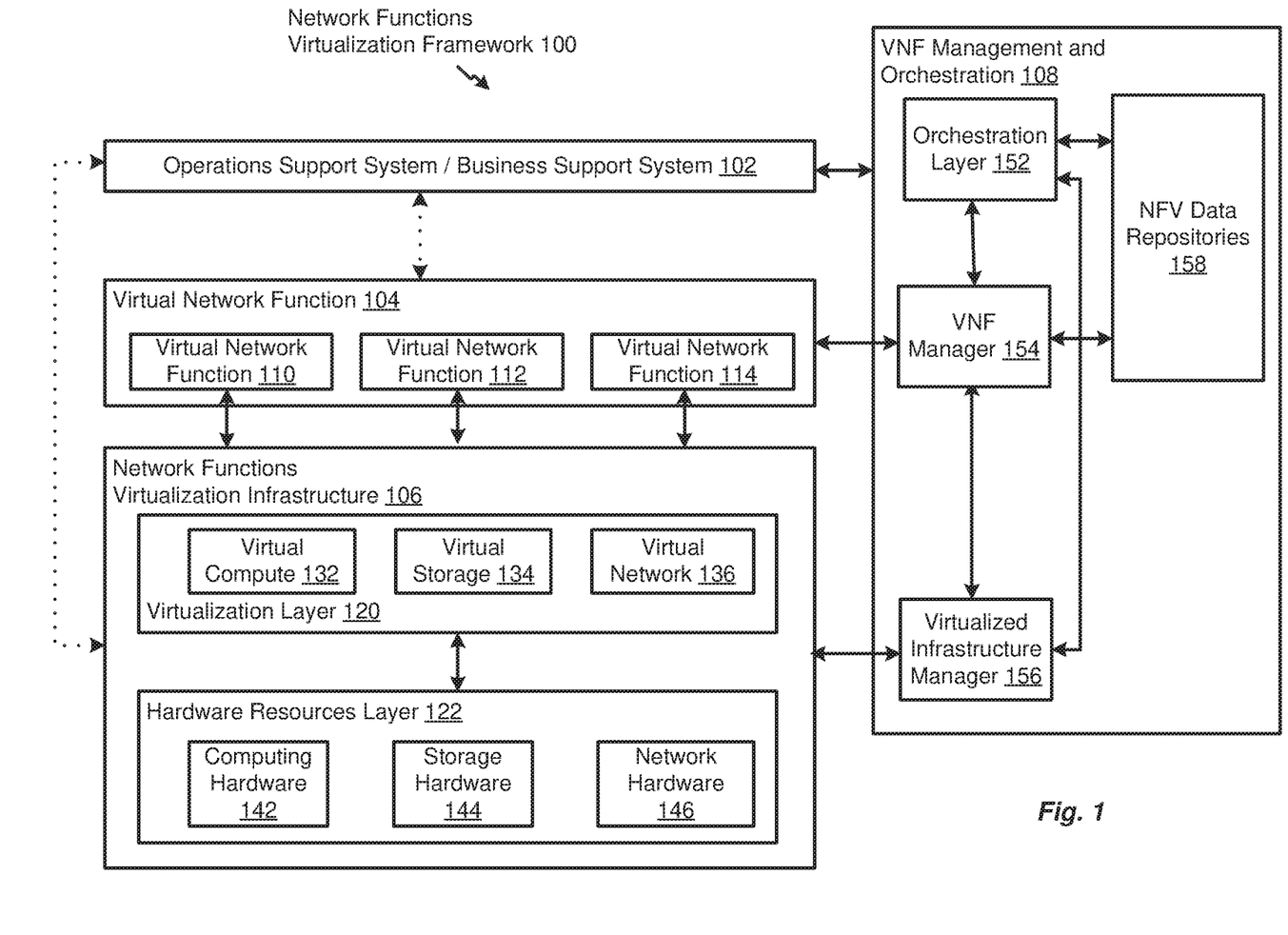
FIG. 1 is a functional block diagram of an embodiment of a network functions virtualization (NFV) framework.

FIG. 1 is a schematic diagram of an embodiment of a network functions virtualization (NFV) framework 100 for implementing network functions.

Generally, a NFV framework 100 is deployed in a cloud infrastructure to orchestrate and deploy a virtual machine, which in turn supports a VNF. The NFV framework 100 includes an operations support system (OSS)/business support system (BSS) module 102, a virtual network function (VNF) module 104, network functions virtualization infrastructure (NFVI) module 106, and a VNF management and orchestration (MANO) module 108. A module may be a virtual element, a physical network element, or embedded in a physical network element. The OSS/BSS module 102 is configured to support management functions such as network inventory, service provisioning, networking configurations, and fault management. Further, the OSS/BSS module 102 is configured to support end-to-end telecommunication services. The OSS/BSS module 102 is configured to interact with the VNF module 104, the NFVI module 106, and the VNF MANO module 108.

The VNF module 104 may be a software implementation of a network function which is capable of running over the NFVI module 106. The VNF module 104 may include VNFs 110, 112, and 114. In an embodiment, the VNF module 104 may correspond to a network node in a system and may be free from hardware dependency.

The NFVI module 106 is configured to provide virtual resources to support the execution of the VNFs 110, 112, and 114. The NFVI module 106 may include commercial off-the-shelf hardware, which is a product or service developed and marketed commercially, referring to general-purpose computing, storage, and networking gear, generally without proprietary hardware or software loads. The NFVI module 106 may further include a software layer which virtualizes and abstracts the underlying hardware of the hardware resources layer 122. For example, the NFVI module 106 may include a virtualization layer 120 having a virtual compute module 132, a virtual storage module 134, and a virtual network module 136. The virtualization layer 120 may be operably coupled to hardware resources layer 122 including, but not limited to, computing hardware 142, storage hardware 144, and network hardware 146.

The VNF MANO module 108 is configured to orchestrate and manage physical and/or software resources that support the infrastructure virtualization. The VNF MANO module 108 includes parameters configured to implement virtualization-specific management tasks for the NFV framework 100. The VNF MANO module 108 may be driven by a packet flow request that describes services, VNFs, and infrastructure requirements.

In an embodiment, the VNF MANO module 108 includes an orchestration layer 152, a VNF manager 154, and a virtualized infrastructure manager (VIM) 156. The orchestration layer 152, the VNF manager 154, and the VIM 156 are configured to interact with each other. Further, the VNF manager 154 may be configured to interact with and to manage the VNF module 104 and the VIM 156 may be configured to interact with and manage the NFVI module 106.

The VIM 156 interacts directly with the NFV infrastructure (physical devices, host OS, and Virtualization Layer) and is tasked with deploying and managing these NFVI elements. Software that is implementing VIM 156 functionality maintains an inventory of the physical resources as well as keeps track of their utilization and the allocation of these resources to virtualization pools. Because networking hardware and the virtualized networking pools are managed by the VIM 156, one of the roles of the VIM 156 is to orchestrate the virtual links coupling with the VNFs 110, 112, and 114.

The VNF Manager 154 creates, deletes, and updates VNF module 104 resources, and controls lifecycles for the VNFs 110, 112, and 114. The orchestration layer 152 performs resource and service orchestration through the VIM 156 or by engaging the VNF manager 156. Service orchestration implies that the orchestration layer 152 coordinates the service components deployed (for example, the VNF module 104, links between VNFs 110, 112, and 114, connectivity information between them, etc.) and manages the respective life cycles. Resource orchestration by the orchestration layer 152 involves overseeing the allocation of resources of the hardware resources layer 122, and monitors allocations for the services.

The VIM 156 operates to maintain a hardware repository (storage, computing, and networking) in the NFV Data Repositories 158, tracks the allocation or the virtualized pool for these resources, interacts and manages a virtual machine hypervisor of the virtualization layer 120, and tracks hardware utilization and state of the hardware resources layer 122.

The orchestration layer 152 generally operates to provide resource orchestration, service orchestration, and works with other components of the VNF MANO module 108 to orchestrate the network and keep an end-to-end view of the network virtualized by the VNF Framework 100. The orchestration layer 152 uses the NFV data repositories 158 when orchestrating a network service. The NFV data repositories 158 include a network services catalog defining parameters for the VNFs 110, 112, and 114, such as, without limitation, links, life cycles, scalability, and topologies, for offering network services.

Figure 2:
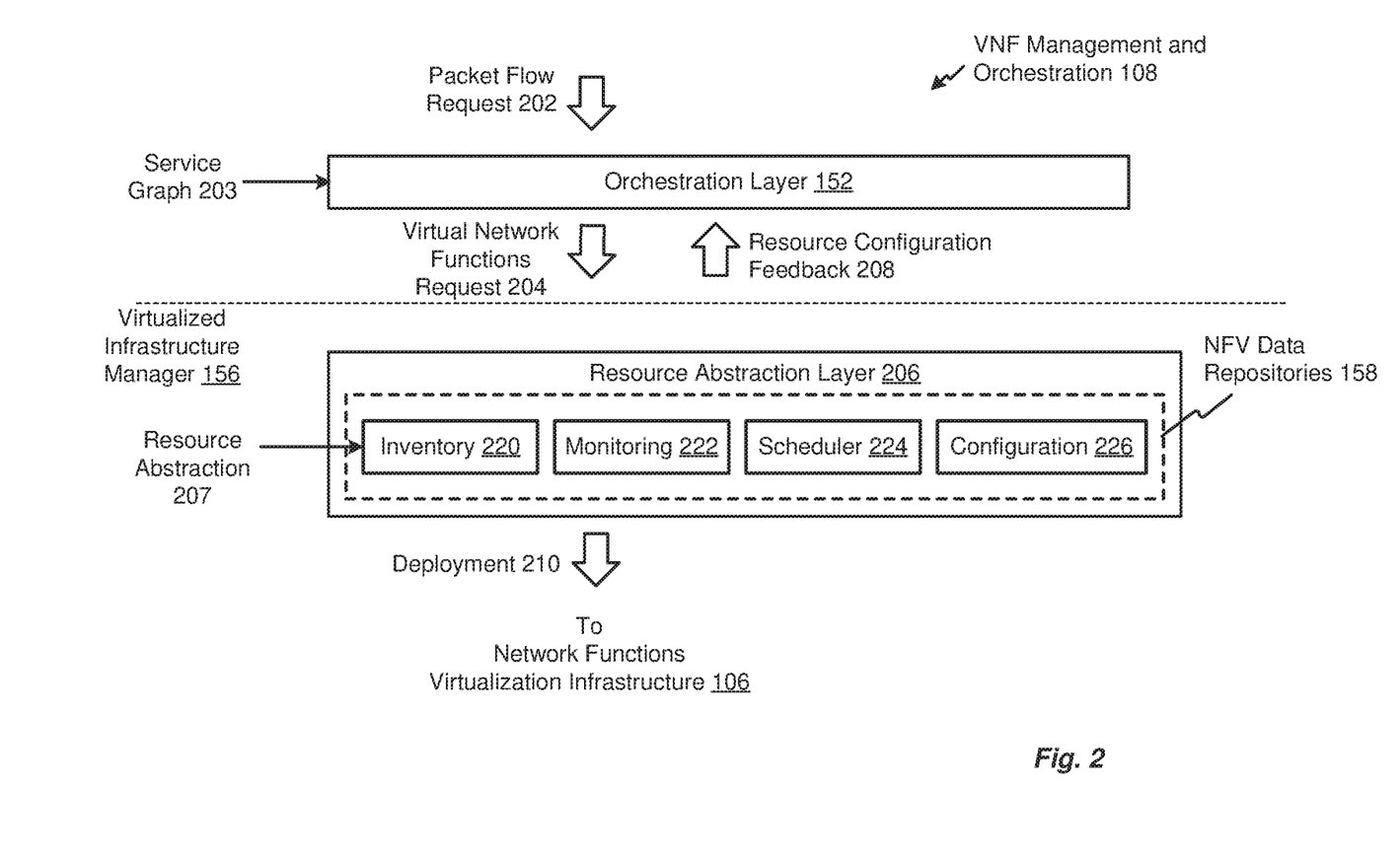
FIG. 2 is a functional block diagram of an embodiment of the virtualized network function (VNF) management and orchestration of FIG. 1.

FIG. 2 is a functional block diagram of an embodiment of the VNF MANO module 108 of FIG. 1. The VNF MANO module 108 includes the orchestration layer 152, a resource abstraction layer 206, and the network functions virtualization infrastructure 106. These layers collectively interact to implement a virtual network function in support of a packet flow based on management flow and resource-availability information. The orchestration layer 152 functions to layout or design a virtual machine to support a network function by assessing the resources required to be allocated, the interconnection of virtual machines (if required), the storage type and allocation, etc. The resource abstraction layer 206 functions to deploy the layout or design conceived at the orchestration layer 152. The deployment includes implementing and executing the details and parameters defined at the orchestration layer 152 to produce a network functions virtualization infrastructure 106. The example of FIG. 2 is generalized to illustrate the interaction for provisioning VNFs 110, 112, and 114, for example, through a VNF framework 100, such as that of FIG. 1.

A service graph 203, with respect to a network, models chains or sequences of flow steering entities that include service instances (such as, for example, forwarding, security, network address translation (NAT), etc.) and traffic classifiers. According to an embodiment, the orchestration layer 152 is configured to identify the flow from the packet flow request 202, and to orchestrate the service instances and traffic classifiers.

After a service instance performs its inherent function via a VNF module 104 (through, for example, VNFs 110, 112, and 114), the orchestration layer 152 steers the data traffic packet to the next VNF module 104. Wherever flow path forking and merging is called upon by the service graph 203, additional classifiers can be implemented for the orchestration layer 152 to steer a subset of the data traffic along different paths of virtualized network functions. Based on the packet flow request 202 and the service graph 203, the orchestration layer 152 generates and initiates required virtual network functions and sends virtual network functions request 204 to the VIM 156.

The VIM 156 includes a resource abstraction 207 to populate, at least in part, the NFV data repositories 158. The resource abstraction 207 operates to decouple hardware and software layers by providing common independent interfaces to the software for accessing the hardware resources via a management and network orchestration parameter. Such parameters provide deployment templates for resources used to interconnect virtual network functions. The virtual network functions in turn form portions of a network service and associated service endpoints, and also are used to couple with a physical network function, which is described in detail with reference to FIG. 3.

NFV data repositories 158 operate to allow states and resource monitoring in the management and orchestration of the VNF framework 100. The NFV data repositories 158 include, for example, inventory 220, monitoring 222, scheduler 224, and configuration 226. Inventory 220 relates to the underlying hardware or physical architecture (such as storage, computing and networking) for support of the VNF framework 100. Monitoring 222 operates to track states of the underlying physical architectures. Scheduler 224 operates to organize the scheduling of physical architecture resources. Configuration 226 operates to configure the underlying hardware architecture for the network functions supported by the VNF framework 100.

In operation, the orchestration layer 152 instantiates required virtualized network functions and communicates with the components of the VNF MANO module 108 in response to a virtual network functions request 204. The virtual network functions request 204 relays the number of virtual machines called on to support the virtualized network functions, and correspondingly, an inventory 220 to form the virtual machines. The resource abstraction layer 206 provides a resource confirmation feedback 208, which confirms with the orchestration layer 152 the availability of inventory 220 for the virtual machines to execute the virtual network functions, including joint component operation of the inventory 220 (such as a cooperation of different server architectures, which is discussed in detail with reference to FIG. 3). On successful configuration of the virtualized network functions through the VIM 156, an instruction or command for deployment 210 is transmitted for receipt by the NFVI module 106 to be executed by the virtual machines.

Figure 3:
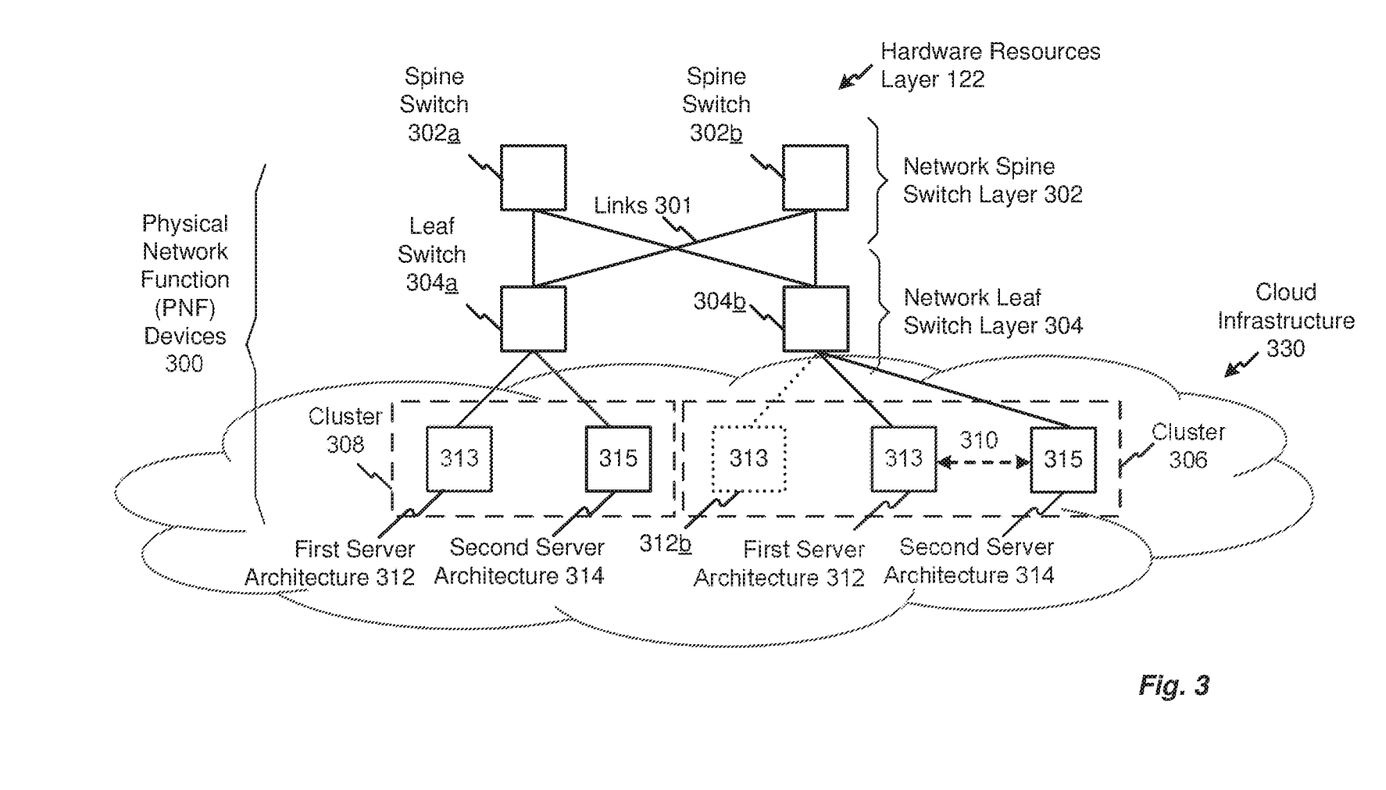
FIG. 3 is a simplified block diagram of an embodiment of a physical network function (PNF) devices that underlie the VNF framework of FIG. 1.

FIG. 3 is a simplified schematic diagram of an embodiment of physical network function (PNF) devices 300, which operate to provide the physical resources that underlie the VNF framework 100. With respect to the VNF framework 100, the PNF devices 300 relate to the hardware resources layer 122. The PNF devices 300 are reduced to provide the resource abstraction 207 of FIG. 2. The hardware resources layer 122 includes PNF devices 300 that cooperate to form a cloud infrastructure 330. The NFV framework 100 may be used to implement virtualized network functions (VNFs) based on a first server architecture 312 and second server architecture 314 for clusters 306 and 308.

The hardware resources layer 122 includes a network spine switch layer 302 and a network leaf switch layer 304.

The hardware resources layer 122 allows routing and addressing capabilities to form a cloud infrastructure 330. The cloud infrastructure 330 includes server hardware, such as cluster 308 and 306. As may be appreciated, a cloud infrastructure 330 may be deployed as a cloud-hosted service that pools needed resources and uses these resources as common shared entities, which can be scaled, upgraded, made accessible, and managed without strict geographic and physical boundaries. Cloud-based hosting may be made available through publicly offered services deployed, for example, by data centers, or through basic services that may be offered through a smaller number of servers accessible to a limited group of users. The cloud infrastructure 330 may be implemented, for example, as a public cloud, a private cloud, a hybrid cloud, etc., as described earlier above.

The network spine layer 302 and the network leaf switch layer 304 (or leaf-spine topology) may be considered as an extension from Ethernet fabric networks to the application in cloud infrastructures. Other access structures may be implemented, such as a hierarchical tree data center networking model, which is based on a layer designation that may include a core/aggregation/access layer network topology that may incur data traffic congestion due to bottleneck conditions.

The network leaf switch layer 304 includes leaf switches 304a and 304b that form an access layer. In turn, the leaf switches 304a and 304b are fully meshed to a series of spine switches 302a and 302b of the network spine layer 302 through links 301. Being in a mesh configuration, network leaf switch layer 304 of the leaf switches 304a and 304b are configured to be no more than one hop away from one another to minimize latency and minimize the potential of bottlenecks between the leaf switches 304a and 304b.

The network leaf switch layer 304 is linked to clusters 306 and 308, which in turn form the cloud infrastructure 330 for provisioning of services such as Internet as a Service (IaaS), Storage as a Service (StaaS), Backup as a Service (BaaS), Software as a Service (SaaS), or with respect to the example architecture of cluster 306, a Network Processor as a Service (NPaaS).

Generally, cloud service providers seek to expand and scale their network services in an efficient manner, so as to not incur a significant increase in cost. One aspect is to implement a leaf-spine architecture as opposed to a hierarchical tree data center architecture model. Another aspect is with respect to the underlying architecture of the clusters, such as those of clusters 306 and 308.

The example of cluster 306 includes a first server architecture 312 and a second server architecture 314 that may be complementarily configured to service open systems interconnection (OSI) model layers. The first server architecture 312 includes a first resource set 313 relating to high performance operations, such as data traffic routing and/or delivery instances where transmission speed and delay avoidance are at a premium (such as with video content delivery for on-demand services). The first server architecture can be configured to service layer 2 (that is, a data link layer) and/or layer 3 (that is, a network layer) network function, including, but not limited to, a service function chaining (SFC) network function, a point-to-point protocol over Ethernet (PPPOE) function, a link network address translation (NAT) network function, a router function, etc. For example, the first server architecture 312 may operate to provide hierarchical quality of service (HQoS), which is a quality of service function that hierarchically controls services and users in the cloud infrastructure 330. HQoS functions to control bandwidth of different services under a content provider as well as that of a user to improve data traffic throughput.

The second server architecture 314 includes a second resource set 315 relating to cloud services where data latency or throughput may not be an issue, such as data traffic management functions including fault, configuration, performance, accounting and/or security management functions. The second server architecture can be configured to service level 4 through level 7 (such as, for a transport layer (L4), a session layer (L5), a presentation layer (L6) and an application layer (L7)) network functions including, but not limited to, a security network function, a uniform resource locator (URL) filter network function, a parental control network function, etc. In operation, when data traffic includes traffic flow operations and a data traffic management function, the first server architecture 312 and the second server architecture 314 may be coupled for joint processing of a data traffic flow through a virtual tunnel 310.

As contrasted with a smart network interface card (NIC) discussed earlier, clusters such as cluster 306 and 308 can be scalable in view of data traffic demand, without the need to address a specialized component, such as a smart NIC, that is intertwined in with an existing architecture and that must be configured and/or addressed when modifying the underlying build-out or scaling. For example, scaling can be provided by the addition of a first server architecture 312b (shown in phantom lines) to expand resources of the first server architecture 312.

With respect to cooperation between the first server architecture 312 and the second server architecture 314 for chaining service functions, an example data traffic flow carries information, such as through a packet header, relating to a data payload. As discussed earlier, the orchestration layer 152 operates on a packet flow request 202, and orchestrates the resources of the physical network layer for deployment 210. The header information may indicate to the orchestration layer 152, for example, that the data payload includes 100 Gigabytes of data traffic including service provider VLAN (SVLAN) data traffic and customer VLAN (CVLAN) data, and further including a traffic, with a traffic rate limiting NAT, and a request for firewall security.

Continuing with the example, the first server architecture 312 of cluster 308 only has 50 Gigabytes of data capacity remaining, and lacks sufficient memory to accommodate the packet data. The first server architecture 312 of the cluster 306, in contrast, has sufficient resources for supporting the data payload. A firewall security function can be provided by the second server architecture 314 (such as, for example, an x86 architecture). These components can be selected to provide virtual network functions through the NFV framework 100. The orchestration layer 152 orchestrates a tunnel 310 (indicated in phantom lines) between the first server architecture 312 and the second server architecture 314, and deploys the resources via a deployment 210 as discussed in detail with regard to FIG. 2 above.

Figure 4:
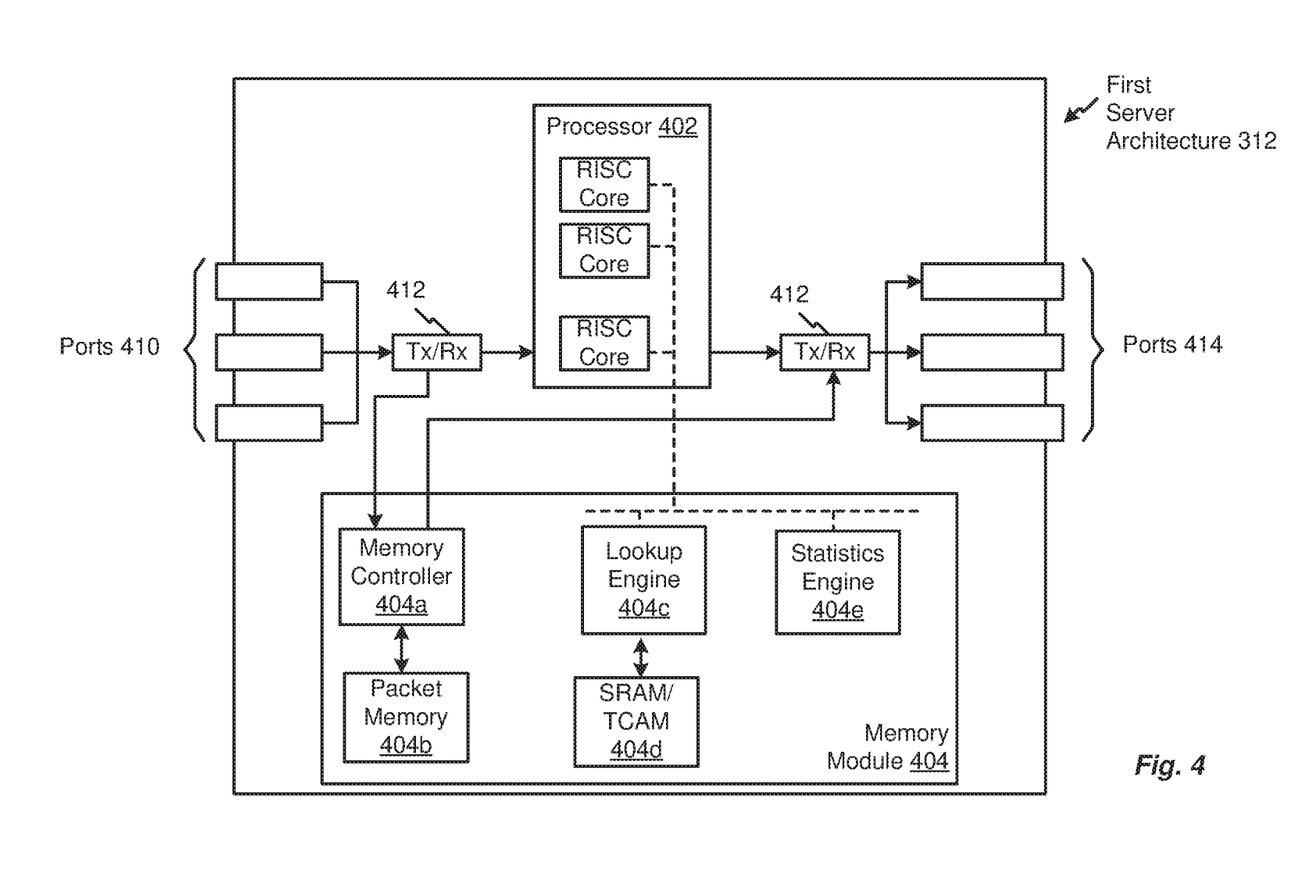
FIG. 4 is a block diagram of an embodiment of server architecture.

FIG. 4 is a schematic diagram of an embodiment of a first server architecture 312 of the PNF devices 300 of FIG. 3, with the understanding that the second server architecture 314 may implement a general processor, memory, and interface configuration directed to provide virtual network functions not related to data throughput or streaming (that is, non-latency affected network services).

The first server architecture 312 may comprise one or more ports 410 coupled to a transceiver (Tx/Rx) 412, which may be transmitters, receivers, or combinations thereof. The Tx/Rx 412 may transmit and/or receive frames from other network nodes via the ports 410. Similarly, the first server architecture 312 may comprise another Tx/Rx 412 coupled to a plurality of ports 414, wherein the Tx/Rx 412 may transmit and/or receive frames from other nodes via the ports 414. The ports 410 and 414 may operate for a switching function to support packet data flow, and include electrical and/or optical transmitting and/or receiving components. The first server architecture 312 may be structured for network function chaining of data packets and/or traffic, while the second server architecture 314 may be structured on legacy networking architectures (for example, x86 platform architectures) for deploying management functions such as fault, configuration, performance, accounting and security management functions.

With respect to the first server architecture 312, a processor 402 may be coupled to the Tx/Rx 412 and may be configured to process the packets and/or determine to which nodes to send (e.g., transmit) the packets. In one embodiment, processor 402 may comprise one or more multi-core processors, such as reduced instruction set computer (RISC) core processors, and/or memory modules 404, which may function as data stores, buffers, etc. The processor 402 may be implemented as a general processor or may be part of one or more application specific integrated circuits (ASICs), digital signal processors (DSPs), network processor units (NPUs) and/or field programmable gate arrays (FPGAs). Although illustrated as a multi-processor, the processor 402 is not so limited and may comprise single or multiple processors. The processor 402 may be configured to implement any of the schemes described herein, including method 500 as described in detail with respect to FIG. 5.

Still referring to the example of FIG. 4, the memory module 404 may be coupled to the processor 402 and may be a non-transitory medium configured to store various types of data. For example, memory module 404 may comprise memory devices including packet memory 404b, read only memory (ROM), and random access memory (RAM), such as static random access memory (SRAM) and/or ternary content-addressable memory (TCAM) 404d accessible via a lookup engine 404c and/or statistics engine 404e. The packet memory 404b is typically comprised of one or more disk drives, solid-state drives (SSDs), and/or tape drives and is used for non-volatile storage of packet data and may operate as an over-flow data storage device if the SRAM and/or TCAM 404d is not large enough to hold all working data. The packet memory 404b may be used to store programs in addition to packet data. These programs are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The SRAM is used to store volatile data and perhaps to store instructions. Access to the ROM, the SRAM, and/or TCAM 404d is typically faster than to the packet memory 404b.

The memory module 404 may be used to house the instructions for carrying out the system and methods described herein, e.g. as a lookup engine 404c and statistics engine 404e. In one embodiment, the memory module 404 may comprise a service function chaining for providing on-demand data services, such as multi-media content and/or data stream access.

As an example of a chaining network function orchestrated by the NFV framework 100, the ports 410 collect data or Internet Protocol (IP) packet, and distribute the packet header to the processor 402, and send the entire packet to a memory controller 404a of the memory module 404. The orchestration layer 152 of the NFV framework 100, based on the packet information, determines resources to service the data packet, such as the line rate (or bandwidth) requirement, the amount of memory a TCAM requires, scheduling of the processor core(s), and determining whether data hazards are present (and whether the second server architecture 314 is brought into service to process the data packet). With sufficient resources provided by a cluster 306 and/or 308, the orchestration layer 152 deploys the resources of the respective server architectures of a cluster 306 and/or 308.

In the example of service function chaining, a memory controller 404a stores the packet data into the packet memory 404b of the memory module 404. The processor 402 operates to analyze the data packet header. In analyzing the data packet header, the processor 402 may perform an error check on the packet header (such as via a checksum). Further, the processor 402 operates to retrieve an IP address, and perform a NAT lookup from a NAT stored in the SRAM/TCAM 404d. The lookup engine 404c performs the NAT lookup in a routing table based on the IP address, and retrieves output port information via the upstream ports. The lookup engine 404c returns the information to the processor 402.

Based on the information retrieved from the NAT, the processor 402 generates and/or modifies an IP header (such as a Time-To-Live (TTL) field, Cyclic Redundancy Code (CRC) field, etc.), and notifies the memory controller 404a to retrieve the data packet. The data packet is provided to the Tx/Rx 412 for output via the ports 414. The Tx/Rx 412 appends the packet header from the processor 402 into the data packet, and transmits the data packet via the ports 414. It is understood that by programming and/or loading executable instructions onto either of the first server architecture 312 and the second server architecture 314, at least one of the processor 402, the cache, and the long-term storage are changed, transforming the first server architecture 312 and/or the second server architecture 314 in part into a particular machine or apparatus, e.g. a multi-core chaining architecture, taught by an embodiment of the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus. While the components of the first server architecture 312 have been described with reference to FIG. 4, similar components and configurations may be used to implement other elements/systems described herein.

Figure 5:
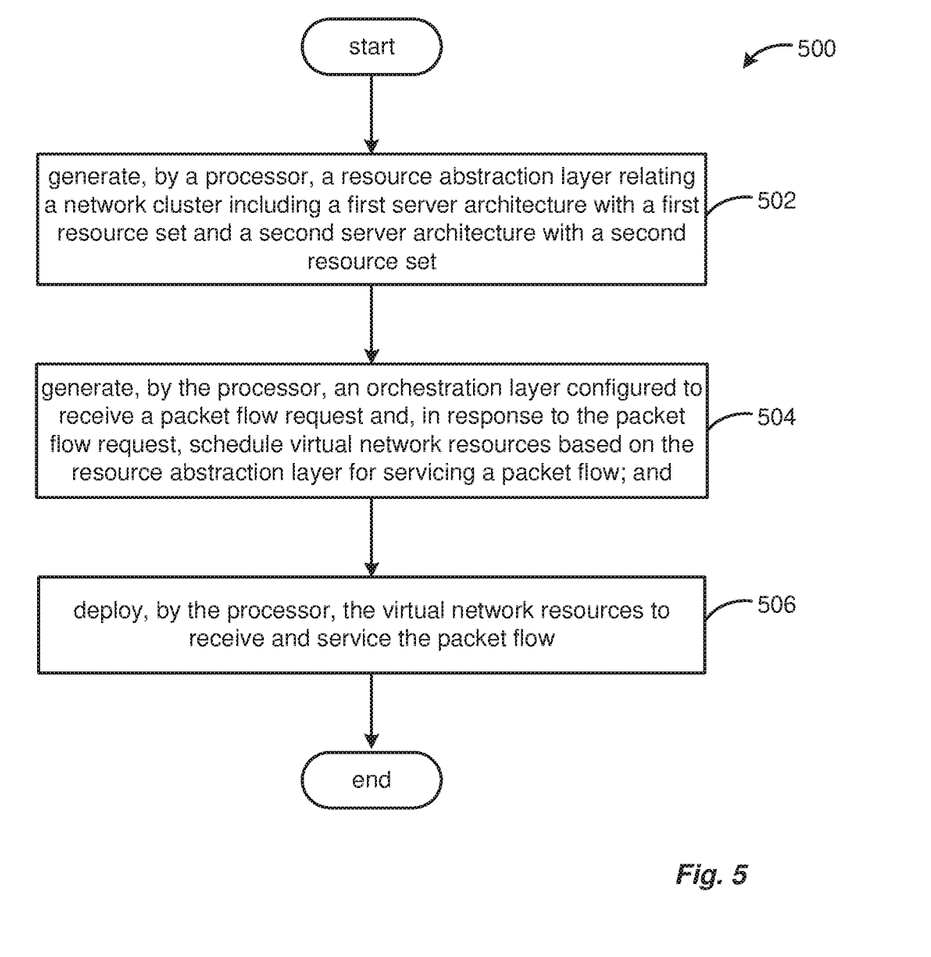
FIG. 5 is a flowchart illustrating an embodiment of a method in a cloud infrastructure with a multiple server-architecture cluster.

FIG. 5 is a flowchart illustrating an embodiment of a method 500 in a cloud infrastructure for a multiple server-architecture cluster for providing a virtual network function. In the embodiment, the method 500 is implemented in a virtual network framework 100, and used, when, for example, a packet requiring a virtual network function, such as a service function chaining architecture, in provisioning a cloud function service such as described above.

At block 502, the method generates, by a processor, a resource abstraction layer relating a network cluster including a first server architecture with a first resource set and a second server architecture with a second resource set. The first server architecture and the second server architecture may provide different services directed towards the respective architectures. For example, the first server architecture may comprise a service function chaining (SFC) architecture, and the second server architecture may comprise a security network function architecture. As may be appreciated, the first server architecture may comprise other architectures configured to service network functions, such as a point-to-point protocol over Ethernet (PPPOE) network function, a link network address translation (NAT) network function, a router function, etc.

At block 504, the method generates, by the processor, an orchestration layer configured to receive a packet flow request and, in response to the packet flow request, schedules virtual network resources based on the resource abstraction layer for servicing a packet flow. As may be appreciated, the orchestration layer is further configured to schedule resources for a tunnel connection between the first server architecture and the second server architecture for jointly servicing the packet flow.

At block 506, the processor deploys the virtual network resources to receive and service the packet flow. In this respect, the method 500 deploys virtual network functions (VNFs) relating to the service of a packet based on a packet flow request, wherein differing server architectures with differing resource sets may be efficiently deployed by an orchestration layer of a virtual network function framework based on the respective functions they are designed to service. Also, by using different server architectures, an underlying physical network function layer may be scaled based on traffic demands, either through IaaS, StaaS, BaaS, SaaS, or with respect to the example architecture of cluster 306, an NPaaS.

A network apparatus in a cloud infrastructure including processor means, and memory means coupled to the processor means, the memory means configured to store computer instructions that, when executed by the processor means, cause the processor to generate a resource abstraction layer relating a network cluster including a first server architecture with a first resource set and a second server architecture with a second resource set, generate an orchestration layer configured to receive a packet flow request and, in response to the packet flow request, schedule virtual network resources based on the resource abstraction layer for servicing a packet flow; and deploy the virtual network resources to receive and service the packet flow.

A method including means for generating a resource abstraction layer relating a network cluster including a first server architecture with a first resource set and a second server architecture with a second resource set, means for generating an orchestration layer configured to receive a packet flow request and, in response to the packet flow request, scheduling virtual network resources based on the resource abstraction layer for servicing a packet flow, and means for deploying the virtual network resources to receive and service the packet flow.

A method in a cloud infrastructure including processor means for generating a resource abstraction layer relating a network cluster including a first server architecture with a first resource set and a second server architecture with a second resource set, processor means for generating an orchestration layer configured to receive a packet flow request and, in response to the packet flow request, scheduling virtual network resources based on the resource abstraction layer for servicing a packet flow and, processor means for deploying the virtual network resources to receive and service the packet flow.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network apparatus in a cloud infrastructure, comprising:
a memory storing instructions; and
at least one processor in communication with the memory, the at least one processor configured, upon execution of the instructions, to perform the following steps:
generate a resource abstraction layer relating a network cluster including a first server architecture with a first resource set and a second server architecture with a second resource set, the first server architecture providing network functions having a higher throughput characteristic than the network functions provided by the second server architecture, the resource abstraction layer including a management and network orchestration parameter configured to provide a deployment template for virtual network resources to interconnect virtual network functions, and the network cluster scalable without utilizing a network card;
generate an orchestration layer configured to receive a packet flow request and, in response to the packet flow request, schedule the virtual network resources based on the resource abstraction layer for servicing a packet flow; and
deploy the virtual network resources to receive and service the packet flow.

2. The network apparatus of claim 1, wherein the orchestration layer is further configured to schedule the virtual network resources for a tunnel connection between the first server architecture and the second server architecture for jointly servicing the packet flow.

3. The network apparatus of claim 1, wherein the first server architecture is configured to service different functions than the second server architecture.

4. The network apparatus of claim 1, wherein the first server architecture is configured to service at least one of:
a service function chaining (SFC) network function;
a point-to-point protocol over Ethernet (PPPOE) network function;
a link network address translation (NAT) network function; or
a router network function having the higher throughput characteristic and not suitable for offload to the second server architecture.

5. The network apparatus of claim 1, wherein the second server architecture is configured to service at least one of:
a security network function;
a uniform resource locator (URL) filter network function; or
a parental control network function.

6. The network apparatus of claim 1, wherein the packet flow request comprises a traffic flow classification for the packet flow.

7. The network apparatus of claim 1, wherein the network cluster is one of a plurality of network clusters in a stem-leaf configuration to form the cloud infrastructure.

8. A method comprising:
generating a resource abstraction layer relating a network cluster including a first server architecture with a first resource set and a second server architecture with a second resource set, the first server architecture providing network functions having a higher throughput characteristic than the network functions provided by the second server architecture, the resource abstraction layer including a management and network orchestration parameter configured to provide a deployment template for virtual network resources to interconnect virtual network functions, and the network cluster scalable without utilizing a network card;
generating an orchestration layer configured to receive a packet flow request and, in response to the packet flow request, scheduling the virtual network resources based on the resource abstraction layer for servicing a packet flow; and
deploying the virtual network resources to receive and service the packet flow.

9. The method of claim 8, wherein the orchestration layer is further configured to schedule the virtual network resources for a tunnel connection between the first server architecture and the second server architecture for jointly servicing the packet flow.

10. The method of claim 8, wherein the first server architecture is configured to service different functions than the second server architecture.

11. The method of claim 8, wherein the first server architecture is configured to service at least one of:
a service function chaining (SFC) network function;
a point-to-point protocol over Ethernet (PPPOE) network function;
a link network address translation (NAT) network function; or
a router network function having the higher throughput characteristic and not suitable for offload to the second server architecture.

12. The method of claim 8, wherein the second server architecture is configured to service at least one of:
a security network function;
a uniform resource locator (URL) filter network function; or
a parental control network function.

13. The method of claim 8, wherein the packet flow request comprises a traffic flow classification for the packet flow.

14. The method of claim 8, wherein the network cluster is one of a plurality of network clusters in a stem-leaf configuration to form a cloud infrastructure.

15. A method in a cloud infrastructure, comprising:
generating, by a processor, a resource abstraction layer relating a network cluster including a first server architecture with a first resource set and a second server architecture with a second resource set, the first server architecture providing network functions having a higher throughput characteristic than the network functions provided by the second server architecture, the resource abstraction layer including a management and network orchestration parameter configured to provide a deployment template for virtual network resources to interconnect virtual network functions, and the network cluster scalable without utilizing a network card;
generating, by the processor, an orchestration layer configured to receive a packet flow request and, in response to the packet flow request, scheduling the virtual network resources based on the resource abstraction layer for servicing a packet flow; and
deploying, by the processor, the virtual network resources to receive and service the packet flow.

16. The method of claim 15, wherein the orchestration layer is further configured to schedule the virtual network resources for a tunnel connection between the first server architecture and the second server architecture for jointly servicing the packet flow.

17. The method of claim 15, wherein the first server architecture is configured to service different functions than the second server architecture.

18. The method of claim 15, wherein the first server architecture is configured to service at least one of:
a service function chaining (SFC) network function;
a point-to-point protocol over Ethernet (PPPOE) network function;
a link network address translation (NAT) network function; or
a router network function having the higher throughput characteristic and not suitable for offload to the second server architecture.

19. The method of claim 15, wherein the second server architecture is configured to service at least one of:
a security network function;
a uniform resource locator (URL) filter network function; or
a parental control network function.

20. The method of claim 15, wherein the packet flow request comprises a traffic flow classification for the packet flow.

* * * * *